United States Patent
Shimizu et al.

(10) Patent No.: US 9,821,771 B2
(45) Date of Patent: Nov. 21, 2017

(54) CONTROL DEVICE FOR A VEHICLE, STORAGE MEDIUM OF CONTROL PROGRAM FOR VEHICLE, AND VEHICLE

(71) Applicant: TOYOTA JIDOSHA KABUSHIKI KAISHA, Toyota-shi, Aichi-ken (JP)

(72) Inventors: Tatsuya Shimizu, Okazaki (JP); Yasuhiro Hara, Odawara (JP); Yasuhiro Shirai, Toyota (JP); Masanobu Ohmi, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/019,298

(22) Filed: Feb. 9, 2016

(65) Prior Publication Data

US 2016/0282865 A1     Sep. 29, 2016

(30) Foreign Application Priority Data

Mar. 24, 2015  (JP) ................................ 2015-061596

(51) Int. Cl.
   *G05D 1/00*  (2006.01)
   *B60S 1/02*  (2006.01)
   *B60S 1/08*  (2006.01)

(52) U.S. Cl.
   CPC ............. *B60S 1/0818* (2013.01); *B60S 1/026* (2013.01)

(58) Field of Classification Search
   CPC ................................ B60S 1/0818; B60S 1/026
   USPC .......................................................... 701/25
   See application file for complete search history.

(56) References Cited

U.S. PATENT DOCUMENTS

| | | | |
|---|---|---|---|
| 2010/0020306 A1 | 1/2010 | Hall | |
| 2011/0073142 A1* | 3/2011 | Hattori | B60S 1/0848 |
| | | | 134/56 R |
| 2014/0270379 A1 | 9/2014 | Snider | |
| 2015/0151722 A1 | 6/2015 | Gokan et al. | |
| 2015/0166021 A1 | 6/2015 | Gokan et al. | |

FOREIGN PATENT DOCUMENTS

| | | | |
|---|---|---|---|
| JP | H11-326541 A | * | 11/1999 |
| JP | 2011-244417 A | | 12/2011 |
| JP | 2013-119299 A | | 6/2013 |
| JP | 2014-101004 A | * | 6/2014 |
| JP | 2015-000628 A | | 1/2015 |
| WO | 2014/010580 A1 | | 1/2014 |

* cited by examiner

*Primary Examiner* — Brian P Sweeney
(74) *Attorney, Agent, or Firm* — Oliff PLC (57) ABSTRACT

A control device for a vehicle including: a peripheral information detection section that detects peripheral information of a vehicle; a sensing section that senses dirt at the peripheral information detection section; a removal section that removes dirt at the peripheral information detection section; and a control section that controls the removal section to remove the dirt, in at least one of a case in which removal of the dirt by the removal section is instructed or a case in which the dirt is sensed by the sensing section.

2 Claims, 6 Drawing Sheets

CONTROL DEVICE FOR A VEHICLE, STORAGE MEDIUM OF CONTROL PROGRAM FOR VEHICLE, AND VEHICLE

CROSS-REFERENCE TO RELATED APPLICATION

This application is based on and claims priority under 35 USC 119 from Japanese Patent Application No. 2015-061596 filed on Mar. 24, 2015, the disclosure of which is incorporated by reference herein.

BACKGROUND

Technical Field

The present invention relates to a control device for a vehicle, a storage medium of a control program for a vehicle and a vehicle, that carry out control for maintaining the detection performance of any of various types of sensors or a camera or the like that detects peripheral information of a vehicle.

Related Art

There are vehicles in which a peripheral information detecting device, such as a sensor or a camera or the like, for detecting peripheral information of the vehicle is installed.

For example, US Patent Application Publication No. 2010/0020306 discloses a structure in which a LIDAR device (a peripheral information detecting device), that is equipped with a sensor having a photon detector for detecting peripheral information of a vehicle, is disposed on the roof of the vehicle.

However, because a peripheral information detecting device that is provided at the exterior of a vehicle as in US Patent Application Publication No. 2010/0020306 is exposed to wind and rain, there are cases in which the device main body becomes dirty or the like, and the peripheral information detection performance deteriorates. It can be thought to provide the peripheral information detecting device within the vehicle, but even when the peripheral information detecting device is provided within the vehicle, there are cases in which the peripheral information detection performance deteriorates due to fogging or dirtiness or the like of the windows. Therefore, there is room for improvement from the standpoint of maintaining the peripheral information detection performance good.

SUMMARY

In view of the above-described circumstances, an object of the present invention is to prevent deterioration in the performance of detecting peripheral information of a vehicle.

In order to achieve the above-described object, a first aspect of the present invention includes: a peripheral information detection section that detects peripheral information of a vehicle; a sensing section that senses dirt at the peripheral information detection section; a removal section that removes dirt at the peripheral information detection section; and a control section that controls the removal section to remove the dirt, in at least one of a case in which removal of the dirt by the removal section is instructed and a case in which the dirt is sensed by the sensing section.

In accordance with the first aspect of the present invention, information of the periphery of the vehicle is detected at the peripheral information detection section. For example, any of various types of sensors, a camera, or the like can be applied as the peripheral information detection section, and peripheral information of the vehicle is detected by the any of various types of sensors or the camera.

Dirtiness of the peripheral information detection section is sensed at the sensing section. For example, the sensing section may determine the recognition rate of the peripheral information detection section, or the like, and sense dirtiness from a decrease in the recognition rate, or the like. Or, the sensing section may sense dirtiness by a sensor or the like.

Dirt at the peripheral information detection section is removed by the removal section. For example, the dirt is removed by a washer device or a wiper device or the like.

Further, at the control section, the removal section is controlled so as to remove dirt in at least one of a case in which removal of dirt by the removal section is instructed and a case in which dirtiness is sensed by the sensing section. Due thereto, a deterioration in the performance of detecting peripheral information of the vehicle can be prevented.

Note that, as in a second aspect of the present invention, there may be a structure in which the peripheral information detection section is provided at a vehicle interior, and the control device for a vehicle further has: a fog detection section that detects fogging of windows of the vehicle; and a fog prevention section that prevents fogging of the windows, and the control section further effects control so as to operate the fog prevention section in a case in which fogging of the windows is detected by the fog detection section. Due thereto, in a case in which the peripheral information detection section is provided at the vehicle interior, a deterioration in the detection performance due to fogging of the windows can be prevented.

Further, as in a third aspect of the present invention, the control device for a vehicle may further have a driving control section that generates a travel plan along a preset target route on the basis of peripheral information of the vehicle and map information, and that controls driving such that the vehicle travels autonomously in accordance with the generated travel plan. In this case, as in a fourth aspect of the present invention, control by the control section may be carried out during control by the driving control section. Moreover, as in a fifth aspect of the present invention, the control device for a vehicle may further have a fog prevention section that prevents fogging of windows, wherein the driving control section further controls switching between automatic driving, in which driving is controlled such that the vehicle travels autonomously, and manual driving by a driver, and, in a case in which the driving control section switches from automatic driving to manual driving, the control section operates the fog prevention section, and, in a case in which the driving control section switches from manual driving to automatic driving, the control section further controls the removal section so as to remove the dirt. Due thereto, the visibility of the driver is ensured at the time of switching from automatic driving to manual driving, and the peripheral information detection performance can be ensured at the time of switching from manual driving to automatic driving, and switching of the driving can be carried out safely.

On the other hand, a sixth aspect of the present invention has: a peripheral information detection section that detects peripheral information of a vehicle; a sensing section that senses a state expressing a deterioration in detection performance of the peripheral information detection section; an executing section that executes a predetermined processing that ensures the detection performance of the peripheral information detection section; and a control section that controls the executing section to execute the processing, in at least one of a case in which execution by the executing section is instructed and a case in which the state is sensed by the sensing section.

In accordance with the sixth aspect of the present invention, information of the periphery of the vehicle is detected at the peripheral information detection section. For example, any of various types of sensors, a camera, or the like can be applied as the peripheral information detection section, and peripheral information of the vehicle is detected by the any of various types of sensors or the camera.

Dirtiness of the peripheral information detection section is sensed at the sensing section. For example, the sensing section may determine the recognition rate of the peripheral information detection section, or the like, and sense dirtiness from a decrease in the recognition rate, or the like. Or, the sensing section may sense dirtiness by a sensor or the like.

At the executing section, a predetermined processing that ensures the detection performance of the peripheral information detection section is executed. For example, in a case in which the peripheral information detection section is provided at the vehicle interior, a processing that prevents fogging of the windows may be executed. Or, a processing that removes dirt at the peripheral information detection section may be executed.

Further, at the control section, the executing section is controlled so as to execute the predetermined processing, in at least one of a case in which execution by the executing section is instructed and a case in which a state, that expresses a deterioration in the detection performance, is sensed by the sensing section. Namely, in a case in which a deterioration in the detection performance of the peripheral information detection section is sensed, the predetermined processing that ensures the detection performance is executed, and therefore, a deterioration in the performance of detecting peripheral information of the vehicle can be prevented.

Note that, as in a seventh aspect of the present invention, in a case in which the peripheral information detection section is provided at a vehicle interior, the sensing section may sense fogging of windows as the state, and the executing section may execute a processing, that prevents fogging of the windows, as the predetermined processing. Or, as in an eighth aspect of the present invention, the sensing section may sense dirtiness of the peripheral information detection section as the state, and the executing section may execute a processing, that removes dirt at the peripheral information detection section, as the predetermined processing.

Further, as in a ninth aspect, the present invention may be a storage medium of a control program for a vehicle for causing a computer to function as the control section of the control device for a vehicle of any one of the first through eight aspects.

Moreover, as in a tenth aspect, the present invention may be a vehicle that has: a driving control section that generates a travel plan along a preset target route on the basis of peripheral information of the vehicle and map information, and that controls driving such that the vehicle travels autonomously in accordance with the generated travel plan; and the control device for a vehicle of any one of the first through eighth aspects.

As described above, in accordance with the present invention, there is the effect that a deterioration in the performance of detecting peripheral information of a vehicle can be prevented.

BRIEF DESCRIPTION OF THE DRAWINGS

Exemplary embodiments of the present invention will be described in detail based on the following figures, wherein.

DETAILED DESCRIPTION

Examples of embodiments of the present invention are described in detail hereinafter with reference to the drawings. Note that the following embodiments illustrate examples of a control device for a vehicle.

First Embodiment

Figure 1:
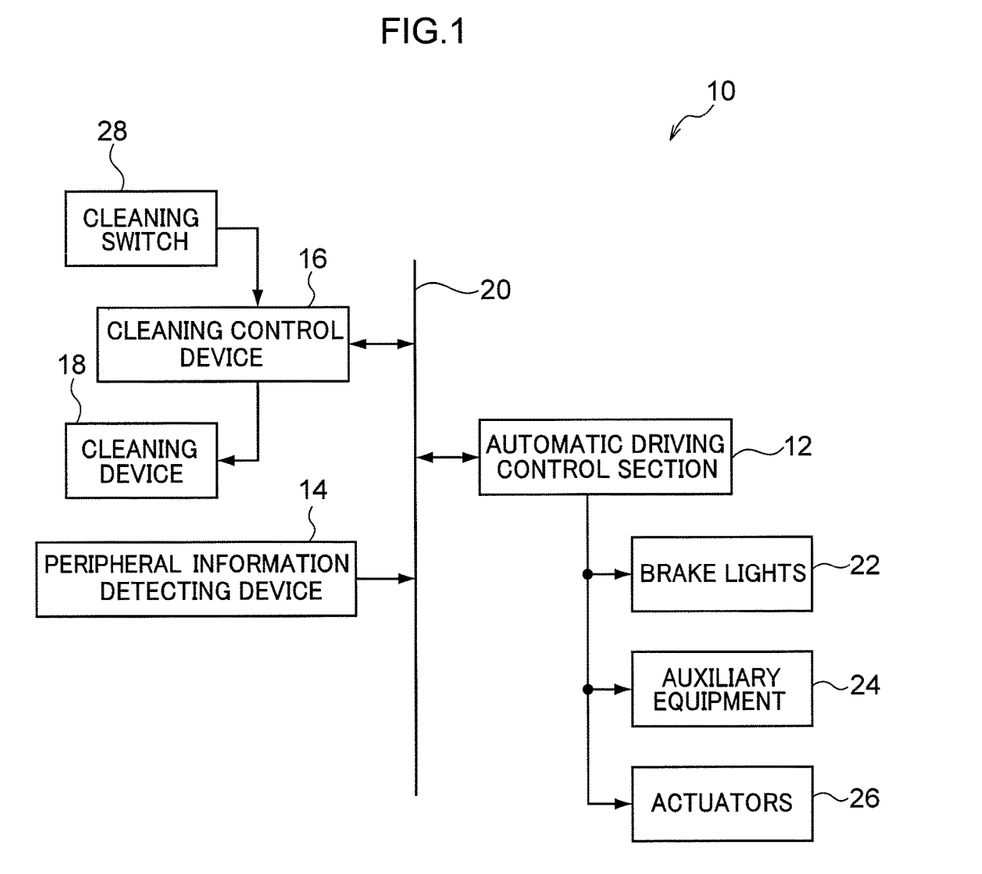
FIG. 1 is a block drawing showing the structure of a control device for a vehicle relating to a first embodiment.

FIG. 1 is a block diagram showing the structure of a control device for a vehicle relating to the present embodiment. A control device 10 for a vehicle relating to the present embodiment is structured to include an automatic driving control section 12 that serves as a driving control section, a peripheral information detecting device 14 that serves as a peripheral information detection section, and a cleaning control device 16 that serves as a sensing section and a control section. Note that these respective devices are connected to an in-vehicle network 20 such as a CAN (Controller Area Network) or the like.

The automatic driving control section 12 is structured by a microcomputer that includes a CPU (Central Processing Unit), a ROM (Read Only Memory), a RAM (Random Access Memory), and the like. Further, brake lights 22, auxiliary equipment (e.g., turn signal lights, front lights, wiper devices, and the like) 24, and actuators 26 are connected to the automatic driving control section 12. Due to programs, that are stored in advance in the ROM, being expanded in the RAM and executed by the CPU, the automatic driving control section 12 controls automatic driving by controlling the operations of the brake lights 22, the auxiliary equipment 24, the actuators 26, and the like. Note that the automatic driving control section 12 may be structured from plural electronic control units.

Concretely, the automatic driving control section 12 controls switching between automatic driving, in which the automatic driving control section 12 judges peripheral information of the vehicle and the situation of the vehicle and carries out control of the vehicle, and manual driving that is carried out by a driver. At the time of automatic driving, in order to cause the vehicle to travel autonomously, the automatic driving control section 12 judges the vehicle and the peripheral information thereof on the basis of information obtained from the peripheral information detecting device 14 such as any of various types of sensors or a camera and the like. Then, in accordance with the results of judgment, the automatic driving control section 12 carries out automatic driving control processing that controls the actuators 26 that drive the amount of acceleration, the amount of braking, the steering angle, and the like. In the automatic driving control processing, on the basis of peripheral information of the vehicle and map information, the automatic driving control section 12 generates a travel plan that runs along a target route that is set in advance, and controls the driving such that the vehicle autonomously travels in accordance with the generated travel plan.

Further, the automatic driving control section 12 stores information that expresses the operational state of traveling of the vehicle, and can output the stored information that expresses the traveling operation state of the vehicle. Information that expresses the operational state of traveling of the vehicle is information that expresses a manual driving state in which the vehicle is being driven manually by a driver, or information that expresses an automatic driving state in which the vehicle is made to travel automatically by the automatic driving control section 12.

Further, the automatic driving control section 12 outputs predetermined information that relates to driving support of the vehicle. Examples of this predetermined information are information expressing the start of the automatic driving control processing, and information expressing the end of the automatic driving control processing, and the like.

For example, in the midst of manual driving by a driver, the automatic driving control section 12 automatically starts the automatic driving control processing in accordance with the behavior of the vehicle and the surrounding situation, and can support the driving of the vehicle by the driver. In this case, the automatic driving control section 12 outputs information expressing the start of the automatic driving control processing. Further, in a case of, in accordance with instructions from the driver, switching from manual driving by the driver to automatic driving that is in accordance with the automatic driving control processing, the automatic driving control section 12 outputs information expressing that a transition of authority over driving is carried out, i.e., predetermined information that is information expressing the start of the automatic driving control processing.

Further, while the automatic driving control processing is being executed, the automatic driving control section 12 can, in accordance with the behavior of the vehicle and the surrounding situation, carry out the processing of automatically ending (cancelling) the automatic driving control processing, and urging manual driving of the vehicle by the driver. In this case, in order to urge the driver to carry out manual driving of the vehicle, the automatic driving control section 12 outputs information expressing the end of the automatic driving control processing. Further, in a case of, in accordance with the instructions of the driver, switching from automatic driving in accordance with the automatic driving control processing to manual driving by the driver, the automatic driving control section 12 outputs information expressing that a transition of authority over driving is carried out, i.e., predetermined information that is information expressing the end of the automatic driving control processing.

Note that the automatic driving control section 12 can be equipped with a transmitter that transmits and receives information between the vehicle and the exterior of the vehicle, and that receives peripheral information. An example of a transmitter is a transmitter that receives the situation of the road by road-vehicle communication such as a wireless transmitter that is in accordance with DSRC (Dedicated Short Range Communications), or the like. Further, examples of information, that expresses the situation of the road and that is received by road-vehicle communication and that is peripheral information, are information expressing the shape and the state of the lanes and the road such as the curvature of the traveling lane, the cant of the road and the like, and the positional relationship of the vehicle with respect to the lane, and the positional relationships with other vehicles that are traveling, and the peripheral traffic volume and the like. Further, the automatic driving control section 12 can include a navigation system as an example of equipment for obtaining peripheral information.

The peripheral information detecting device 14 has any of plural types of sensors or a camera and the like, and detects peripheral information of the vehicle in order for automatic driving by the automatic driving control section 12 to be carried out. The peripheral information detecting device 14 detects information captured by a camera, obstacle information from a radar, obstacle information from LIDAR (Laser Imaging Detection and Ranging), and the like as peripheral information of the vehicle. The peripheral information includes, for example, the positions of the white lines of the traveling lanes with respect to the vehicle, the position of the center of the lane, the road width, the road shape, the situation of obstacles at the periphery of the vehicle, and the like. Note that examples of the road shape are, for example, the curvature of the traveling lane, and undulations and changes in the slope of the road surface that are effective in sight estimation of the sensor, and the like. Further, situations of obstacles at the periphery of the vehicle are, for example, information that differentiates between moving obstacles and fixed obstacles, positions of obstacles with respect to the vehicle, moving directions of obstacles with respect to the vehicle, relative speeds of obstacles with respect to the vehicle, and the like.

The cleaning control device 16 is structured by a microcomputer that includes a CPU, a ROM, a RAM and the like. A cleaning device 18 that serves as a removal section and an executing section, and a cleaning switch 28 for operating the cleaning device 18, are connected to the cleaning control device 16. The cleaning control device 16 controls the operation of the cleaning device 18, that cleans the peripheral information detecting device 14, by expanding the programs, that are stored in the ROM, in the RAM and the CPU executing the programs.

Concretely, in at least one of a case in which the cleaning switch 28 is operated and a case in which the cleaning control device 16 judges whether or not cleaning of the peripheral information detecting device 14 is necessary and judges that cleaning is necessary, the cleaning control device 16 operates the cleaning device 18 and cleans the peripheral information detecting device 14. In the present embodiment, in the judging of whether or not cleaning is necessary, the recognition rate of peripheral information by the peripheral information detecting device 14 is observed, and, if the recognition rate falls beneath a predetermined value, the cleaning device 18 is operated. Concretely, in the case of a camera or a two-dimensional matrix sensor or the like, a portion (a pixel or the like), at which the value does not change over time or the change is minute, is considered to be portion of poor quality, and, if the ratio of poor quality portions becomes greater than or equal to a predetermined value, the cleaning device 18 is operated. Further, in the case of a sensor that is other than a camera or a two-dimensional matrix sensor, whether or not cleaning is necessary is judged, for example, on the basis of the absence/presence of a signal or the signal strength or the like from the peripheral information detecting device 14. Note that whether or not cleaning is necessary may be judged by further providing a sensor or the like that detects dirtiness of the peripheral information detecting device 14 itself, and not by using the recognition rate of the peripheral information detecting device 14.

A washer device that jets water out onto the peripheral information detecting device 14, a wiper device that removes dirt at the detecting portion of the peripheral information detecting device 14 by a wiper blade or the like, or the like can be used as the cleaning device 18. Note that, in a case in which the peripheral information detecting device 14 is provided within the vehicle, it is preferable that the cleaning device 18 be a wiper device and not a washer device.

Figure 2:
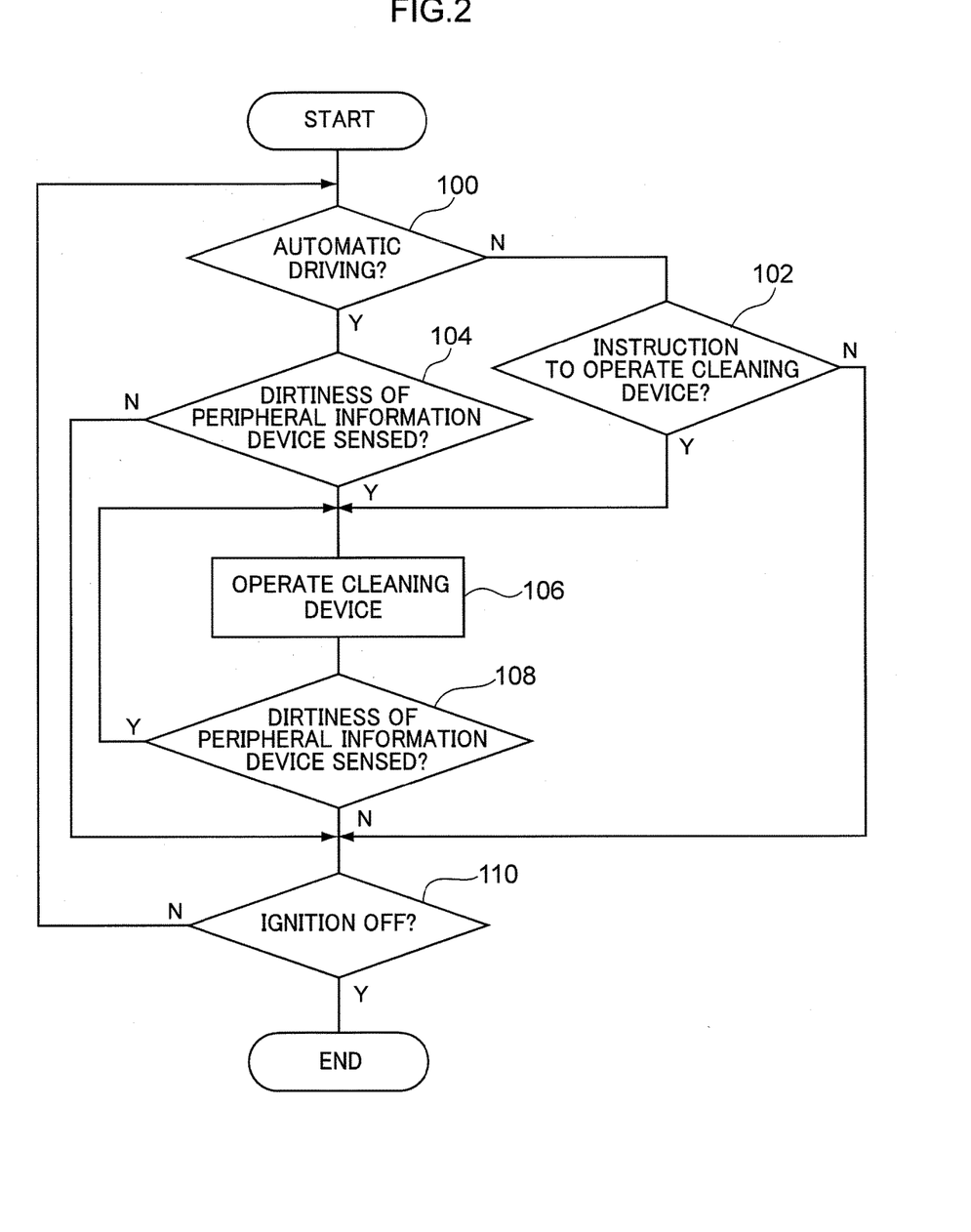
FIG. 2 is a flowchart showing an example of the flow of processings that are carried out by a cleaning control device of the control device for a vehicle relating to the first embodiment.

The concrete processings carried out by the control device 10 for a vehicle, that relates to the present embodiment and that is structured as described above, are described next. FIG. 2 is a flowchart showing an example of the flow of processings that are carried out at the cleaning control device 16 of the control device 10 for a vehicle relating to the present embodiment. Note that the processings of FIG. 2 are described as starting in a case in which an unillustrated ignition switch is turned on, as an example.

In step 100, the cleaning control device 16 judges whether or not the current state of driving is automatic driving. This judgment is carried out on the basis of information outputted from the automatic driving control section 12. In a case in which this judgment is negative, the routine moves on to step 102, and, in a case in which the judgment is affirmative, the routine moves on to step 104.

In step 102, the cleaning control device 16 judges whether or not an instruction to operate the cleaning device 18 has been given. In this judgment, the cleaning control device 16 judges whether or not an instruction to operate the cleaning device 18 has been given by the cleaning switch 28. In a case in which this judgment is affirmative, the routine moves on to step 104, and, in a case in which the judgment is negative, the routine moves on to step 110.

In step 104, the cleaning control device 16 judges whether or not dirtiness of the peripheral information detecting device 14 has been sensed. In this judgment, as described above, the cleaning control device 16 determines the ratio of poor quality portions of the peripheral information detecting device 14, and judges whether or not the determined ratio is greater than or equal to a predetermined value. In a case in which this judgment is affirmative, the routine moves on to step 106, whereas in a case in which the judgment is negative, the routine moves on to step 110.

In step 106, the cleaning control device 16 operates the cleaning device 18, and the routine moves on to step 108. The cleaning control device 16 controls the cleaning device 18 so as to, for example, stop after operating for a predetermined time.

In step 108, in the same way as in step 104, the cleaning control device 16 again judges whether or not dirtiness of the peripheral information detecting device 14 is sensed. In a case in which this judgment is affirmative, the routine returns to step 106 and the above-described processings are repeated, whereas in a case in which the judgment is negative, the routine moves on to step 110.

In step 110, the cleaning control device 16 judges whether or not the ignition switch has been turned off. In a case in which this judgment is negative, the routine returns to step 100 and the above-described processings are repeated, whereas in a case in which the judgment is affirmative, the series of processings is ended.

Due to the cleaning control device 16 controlling the cleaning device 18 in this way, dirtiness of the peripheral information detecting device 14 is sensed and cleaned, and therefore, a deterioration in the performance of detecting peripheral information of the vehicle can be prevented.

Second Embodiment

Figure 3:
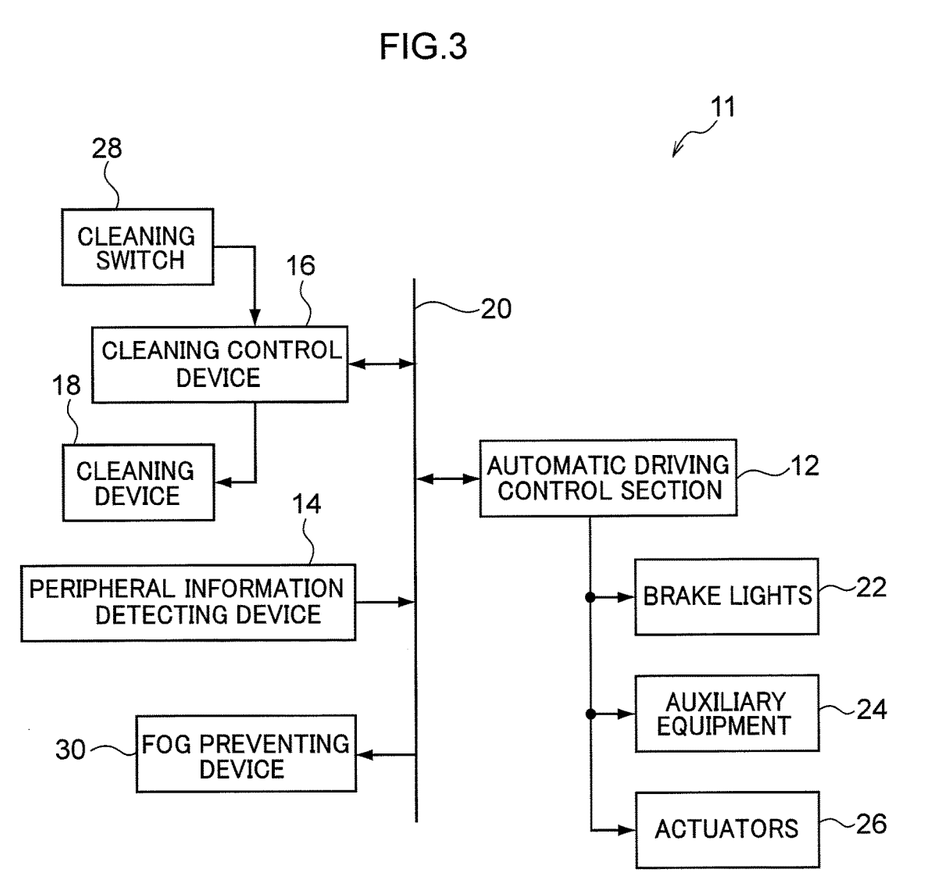
FIG. 3 is a block diagram showing the structure of a control device for a vehicle relating to a second embodiment.

FIG. 3 is a block diagram showing the structure of a control device for a vehicle relating to the present embodiment. Note that structures that are the same as those of the previous embodiment are denoted by the same reference numerals, and detailed description thereof is omitted.

In contrast with the previous embodiment, a control device 11 for a vehicle relating to the present embodiment carries out the following driving switching processing at the time of carrying out switching between manual driving and automatic driving.

Concretely, as shown in FIG. 3, the present embodiment differs from the previous embodiment only with regard to the point that a fog preventing device 30, that serves as a fog prevention section and an executing section, is further connected to the in-vehicle network 20. The other structures are the same as those of the previous embodiment.

The fog preventing device 30 removes fog from the windows. For example, the fog preventing device 30 applies the air conditioner or wiper devices for wiping the windows, a de-icing device, a defogger device, or the like, and removes fogging of the windows. Or, fog may be removed from the windows by the fog preventing device 30 opening and closing the windows.

The driving switching processing has a processing in a case of switching from automatic driving to manual driving, and a processing in a case of switching from manual driving to automatic driving. Concretely, in a case of switching from automatic driving to manual driving, the cleaning control device 16 controls the fog preventing device 30, and executes the processing of preventing fogging of the windows. On the other hand, in the case of switching from manual driving to automatic driving, the cleaning control device 16 controls the cleaning device 18, and executes the processing of removing dirt at the peripheral information detecting device 14.

Figure 4:
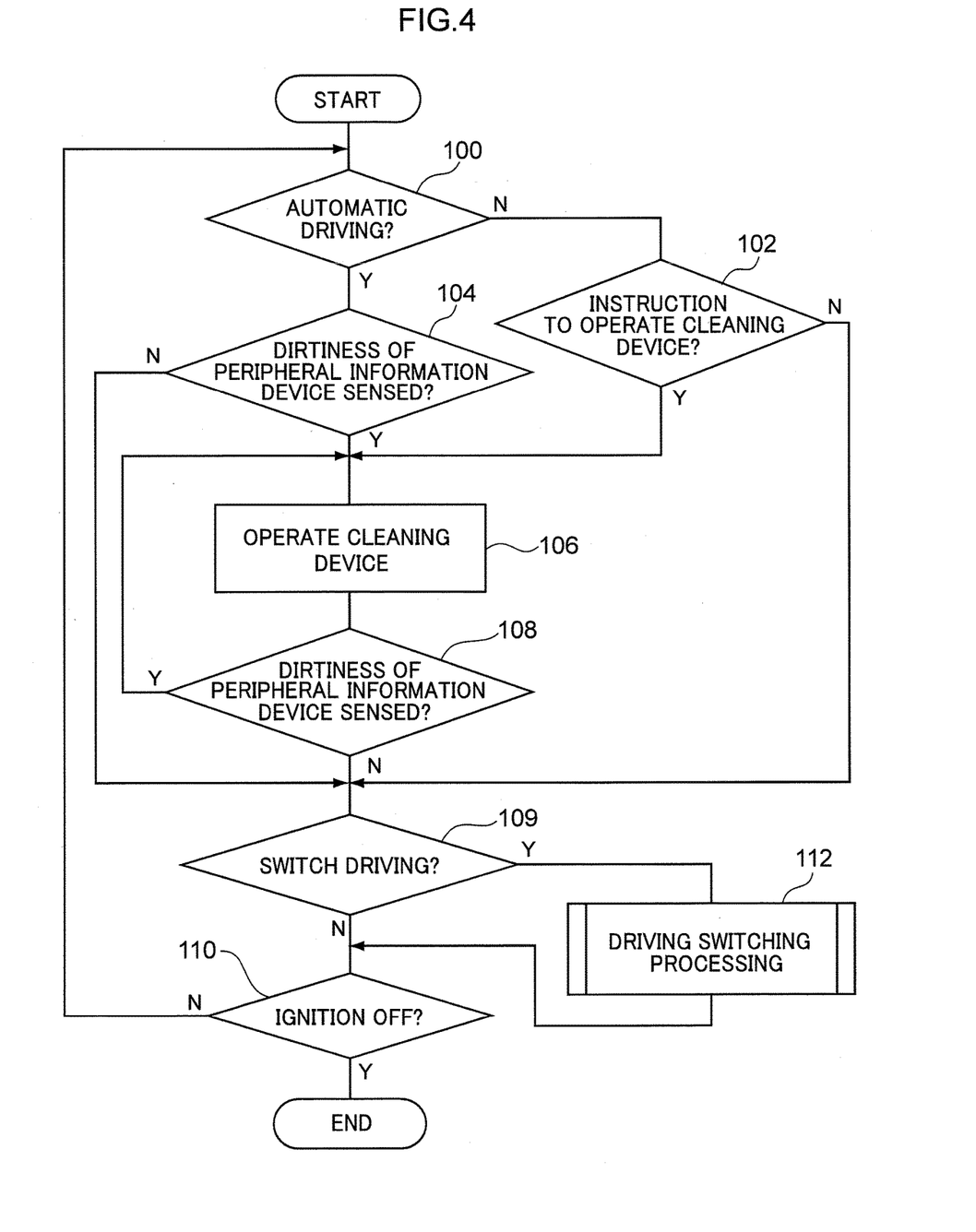
FIG. 4 is a flowchart showing an example of the flow of processings that are carried out by a cleaning control device of the control device for a vehicle relating to the second embodiment.

Concrete processings that are carried out by the control device 11 for a vehicle relating to the present embodiment are described next. FIG. 4 is a flowchart showing an example of the flow of processings that are carried out by the cleaning control device 16 of the control device 11 for a vehicle relating to the present embodiment. Note that the processings of FIG. 4 are described as starting in a case in which an unillustrated ignition switch is turned on, as an example. Further, processings that are the same as those of the previous embodiment are denoted by the same reference numerals and described.

In step 100, the cleaning control device 16 judges whether or not the current state of driving is automatic driving. This judgment is carried out on the basis of information outputted from the automatic driving control section 12. In a case in which this judgment is negative, the routine moves on to step 102, and, in a case in which the judgment is affirmative, the routine moves on to step 104.

In step 102, the cleaning control device 16 judges whether or not an instruction to operate the cleaning device 18 has been given. In this judgment, the cleaning control device 16 judges whether or not an instruction to operate the cleaning device 18 has been given by the cleaning switch 28. In a case in which this judgment is affirmative, the routine moves on to step 104, and, in a case in which the judgment is negative, the routine moves on to step 109.

In step 104, the cleaning control device 16 judges whether or not dirtiness of the peripheral information detecting device 14 is sensed. In this judgment, as described above, the cleaning control device 16 determines the ratio of poor quality portions of the peripheral information detecting device 14, and judges whether or not the determined ratio is greater than or equal to a predetermined value. In a case in which this judgment is affirmative, the routine moves on to step 106, whereas in a case in which the judgment is negative, the routine moves on to step 109.

In step 106, the cleaning control device 16 operates the cleaning device 18, and the routine moves on to step 108. The cleaning control device 16 controls the cleaning device 18 so as to, for example, stop after operating for a predetermined time.

In step 108, in the same way as in step 104, the cleaning control device 16 again judges whether or not dirtiness of the peripheral information detecting device 14 is sensed. In a case in which this judgment is affirmative, the routine returns to step 106 and the above-described processings are repeated, whereas in a case in which the judgment is negative, the routine moves on to step 109.

In step 109, on the basis of information outputted from the automatic driving control section 12, the cleaning control device 16 judges whether or not driving is switched. In a case in which this judgment is affirmative, the routine moves on to step 112, whereas in a case in which the judgment is negative, the routine moves on to step 110.

In step 110, the cleaning control device 16 judges whether or not the ignition switch has been turned off. In a case in which this judgment is negative, the routine returns to step 100 and the above-described processings are repeated, whereas in a case in which the judgment is affirmative, the series of processings is ended.

On the other hand, in step 112, the cleaning control device 16 carries out driving switching processing, and the routine moves on to step 110. Namely, as described above, in a case in which driving is switched from automatic driving to manual driving, the cleaning control device 16 controls the fog preventing device 30, and executes the processing of preventing fogging of the windows. On the other hand, in a case of in which driving is switched from manual driving to automatic driving, the cleaning control device 16 controls the cleaning device 18, and executes the processing of removing dirt at the peripheral information detecting device 14. In this way, due to processing that prevents fogging of the windows being executed in a case of switching to manual driving, the visibility of the driver can be ensured. On the other hand, due to processing, that removes dirt at the peripheral information detecting device 14 by the cleaning device 18, being executed in a case of switching to automatic driving, the detection performance of the peripheral information detecting device 14 can be ensured. Accordingly, switching of the driving can be carried out safely.

Third Embodiment

Figure 5:
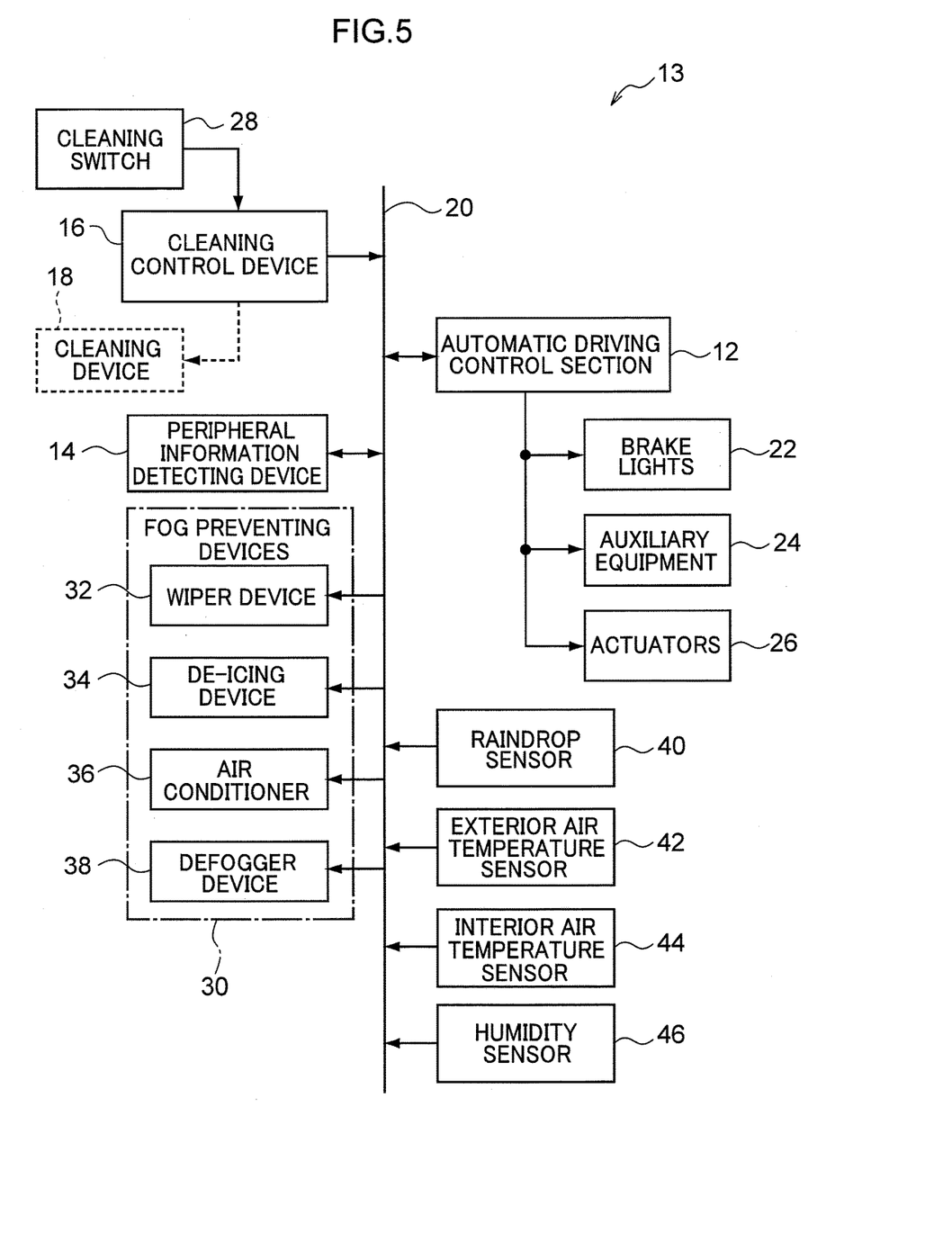
FIG. 5 is a block diagram showing the structure of a control device for a vehicle relating to a third embodiment.

FIG. 5 is a block diagram showing the structure of a control device for a vehicle relating to the present embodiment. Note that structures that are the same as those of the previous embodiments are denoted by the same reference numerals, and detailed description thereof is omitted.

A control device 13 for a vehicle relating to the present embodiment is an example in which the peripheral information detecting device 14 is provided within the vehicle. Because the peripheral information detecting device 14 is provided within the vehicle, the cleaning device 18 may be omitted, and therefore, the cleaning device 18 is shown by the dotted line in FIG. 5.

Further, because the peripheral information detecting device 14 is provided within the vehicle, the fog preventing devices 30 that serve as fog prevention sections and executing sections are provided instead of the cleaning device 18, and the performance of detecting peripheral information is ensured.

Concretely, a wiper device 32, a de-icing device 34, an air conditioner 36, and a defogger device 38 are provided as the fog preventing devices 30, and are respectively connected to the in-vehicle network 20.

Further, in order to control the operations of the respective fog preventing devices 30, sensors such as a raindrop sensor 40, an exterior air temperature sensor 42, an interior air temperature sensor 44, a humidity sensor 46 and the like are connected to the in-vehicle network 20. Further, the cleaning control device 16 controls the operations of the fog preventing devices 30 on the basis of the results of detection of the respective sensors.

In the present embodiment, fogging of the windows (including poor visibility caused by raindrops sticking to the windows) is sensed on the basis of the results of detection of the various sensors. In a case in which fogging of the windows has arisen, the fog preventing devices 30 are operated and the fogging is removed, and the detection performance of the peripheral information detecting device 14 is ensured.

Figure 6:
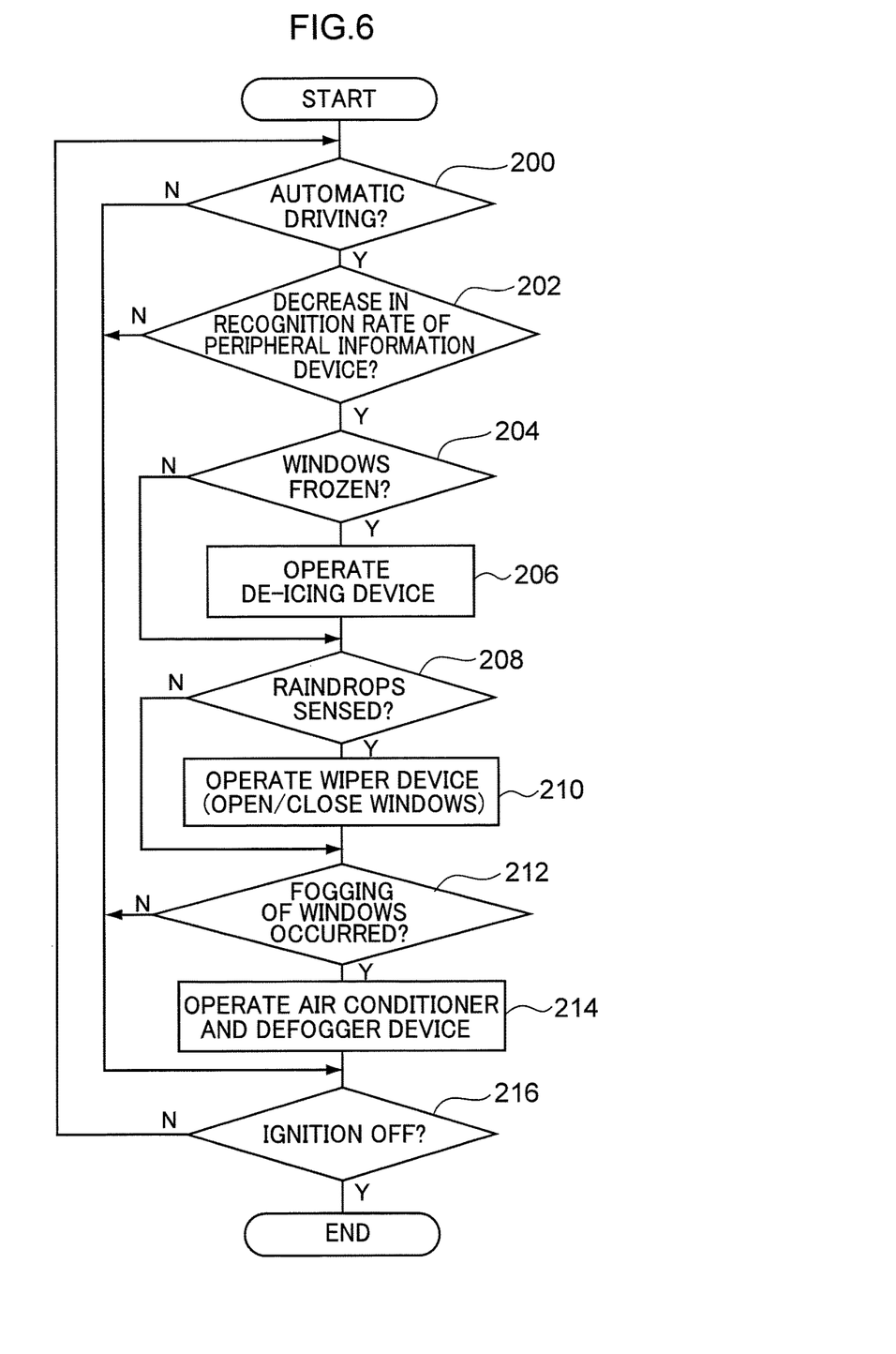
FIG. 6 is a flowchart showing an example of the flow of processings that are carried out by a cleaning control device of the control device for a vehicle relating to the third embodiment.

Concrete processings that are carried out at the control device 13 for a vehicle relating to the present embodiment are described next. FIG. 6 is a flowchart showing an example of the flow of processings that are carried out at the cleaning control device 16 of the control device 13 for a vehicle relating to the present embodiment. Note that the processings of FIG. 6 are described as starting in a case in which an unillustrated ignition switch is turned on, as an example.

In step 200, the cleaning control device 16 judges whether or not the current state of driving is automatic driving. This judgment is carried out on the basis of information outputted from the automatic driving control section 12. In a case in which this judgment is affirmative, the routine moves on to step 202, and, in a case in which the judgment is negative, the routine moves on to step 216.

In step 202, the cleaning control device 16 judges whether or not the recognition rate of the peripheral information detecting device 14 has decreased. In the same way as the sensing of dirtiness of the peripheral information detecting device 14 in the first embodiment, this judgment is carried out by the cleaning control device 16 determining the ratio of poor quality portions of the peripheral information detecting device 14, and judging whether or not the determined ratio is greater than or equal to a predetermined value. In a case in which this judgment is affirmative, the routine moves on to step 204, whereas in a case in which the judgment is negative, the routine moves on to step 216.

In step 204, the cleaning control device 16 judges whether or not the windows are frozen. This judgment is a judgment as to whether a temperature that is less than or equal to a predetermined temperature has been detected by the exterior air temperature sensor 42. In a case in which this judgment is affirmative, the routine moves on to step 206, whereas in a case in which the judgment is negative, the routine moves on to step 208.

In step 206, the cleaning control device 16 effects control so as to operate the de-icing device 34, and the routine moves on to step 208. Due thereto, fogging of the windows that is due to freezing of the windows is removed, and the detection performance of the peripheral information detecting device 14 can be ensured. Note that the de-icing device 34 may be operated for a predetermined time and then stopped, or may be stopped after it is again judged whether or not the windows are frozen.

In step 208, the cleaning control device 16 judges whether or not raindrops have been sensed. This judgment is a judgment as to whether or not raindrops have been sensed by the raindrop sensor 40. In a case in which this judgment is affirmative, the routine moves on to step 210, whereas in a case in which the judgment is negative, the routine moves on to step 212.

In step 210, the cleaning control device 16 effects control so as to operate the wiper device 32, and the routine moves on to step 212. Due thereto, raindrops and fogging of the windows are removed, and the detection performance of the peripheral information detecting device 14 can be ensured. Note that the wiper device 32 may be operated for a predetermined time and then stopped, or may be stopped after it is again judged whether or not raindrops have been sensed. Further, the raindrops may be removed by opening and closing the windows, and not by the wiper device 32. Or, in accordance with the direction of detecting peripheral information, operation of the wiper device 32 and opening/closing of the windows may be carried out.

In step 212, the cleaning control device 16 judges whether or not fogging of the windows has arisen. This judgment is a judgment based on the results of detection of the exterior air temperature sensor 42, the interior air temperature sensor 44, and the humidity sensor 46. For example, it is judged whether or not the respective results of detection satisfy predetermined conditions at which fogging of windows occurs. In a case in which this judgment is affirmative, the routine moves on to step 214, whereas in a case in which the judgment is negative, the routine moves on to step 216.

In step 214, the cleaning control device 16 effects control so as to operate the air conditioner 36 and the defogger device 38, and the routine moves on to step 216. Due thereto, fogging of the windows is removed, and the detection performance of the peripheral information detecting device 14 can be ensured. Note that the air conditioner 36 and the defogger device 38 may be operated for a predetermined time and then stopped, or may be stopped after it is again judged whether or not fogging of the windows has arisen. Further, in accordance with the direction of detecting peripheral information, only either one of the air conditioner 36 and the defogger device 38 may be operated, rather than both the air conditioner 36 and the defogger device 38 being operated together. Or, removal of fog by opening/closing of the windows may be appropriately combined therewith.

In step 216, the cleaning control device 16 judges whether or not the ignition switch has been turned off. In a case in which this judgment is negative, the routine returns to step 200 and the above-described processings are repeated, whereas in a case in which the judgment is affirmative, the series of processings is ended.

Note that, in the present embodiment, in a case in which the peripheral information detecting device 14 is provided also at the exterior of the vehicle, processings that are similar to those of the first embodiment may be carried out with respect to the cleaning device 18 that cleans the peripheral information detecting device 14 that is at the exterior of the vehicle.

Further, in the present embodiment as well, driving switching processing may be carried out at the time of switching driving, as in the second embodiment.

Note that the processings that are carried out by the cleaning control device 16 in the above-described respective embodiments are described as software processings that are carried out by executing programs, but may be processings that are carried out by hardware. Or, these processings may be processings that combine both software and hardware. Further, the above-described programs that are stored in the ROM may be stored on any of various types of storage media and distributed.

Moreover, the present invention is not limited to the above, and can, of course, be implemented by being modified in various ways other than the above within a scope that does not depart from the gist thereof.

What is claimed is:

1. A control system for a vehicle comprising:
 a sensor or a camera that detects peripheral information of a vehicle;
 a remover that removes dirt at the sensor or the camera;
 a fog prevention device that prevents fogging of windows of the vehicle; and
 one or more processors programmed to
  sense dirt at the sensor or the camera,
  control the remover to remove the dirt,
  generate a travel plan along a preset target route on the basis of peripheral information of the vehicle and map information,
  control driving such that the vehicle travels autonomously in accordance with the generated travel plan,
  control switching between automatic driving, in which driving is controlled such that the vehicle travels autonomously, and manual driving by a driver,
  operate the fog prevention device in response to switching from automatic driving to manual driving, and
  control the remover so as to remove the dirt in response to switching from manual driving to automatic driving.

2. The control system for a vehicle of claim 1, wherein the sensor or the camera is provided at a vehicle interior, and
 the control system further comprises one or more fog sensors that detect the fogging of the windows of the vehicle, wherein
 the one or more processors operate the fog prevention device in response to the fogging of the windows being detected by the one or more fog sensors.

* * * * *